(12) United States Patent
Imes

(10) Patent No.: US 8,326,352 B1
(45) Date of Patent: Dec. 4, 2012

(54) DEVICE, NETWORK, SERVER, AND METHODS FOR PROVIDING SERVICE REQUESTS FOR WIRELESS COMMUNICATION DEVICES

(75) Inventor: Kevin Reid Imes, Pflugerville, TX (US)

(73) Assignee: Kevin Reid Imes, Austin, TX (US)

( * ) Notice: Subject to any disclaimer, the term of this patent is extended or adjusted under 35 U.S.C. 154(b) by 0 days.

(21) Appl. No.: 09/943,629

(22) Filed: Aug. 30, 2001

Related U.S. Application Data

(60) Provisional application No. 60/230,339, filed on Sep. 6, 2000.

(51) Int. Cl.
*H04M 1/00* (2006.01)

(52) U.S. Cl. ............. 455/556.1; 455/418; 455/419; 455/414.1; 455/425; 348/333.12; 348/231.2; 348/231.3; 348/208.99; 348/208.7

(58) Field of Classification Search ........... 455/556.1, 455/566.2, 405, 456.2, 550.1, 566, 403, 41.2, 455/435.1, 406, 410, 411, 418, 419, 414.1; 348/333.13, 231.2–231.3, 207.99, 231.99–231.03, 348/208.99, 208.7, 208.11; 345/173
See application file for complete search history.

(56) References Cited

U.S. PATENT DOCUMENTS

| | | | |
|---|---|---|---|
| 3,971,065 A | 7/1976 | Bayer | |
| 4,887,161 A | 12/1989 | Watanabe et al. | |
| 5,493,335 A | 2/1996 | Parulski et al. | |
| 5,506,644 A | 4/1996 | Suzuki et al. | |
| 5,671,451 A | 9/1997 | Takahashi et al. | |
| 5,726,660 A | 3/1998 | Purdy et al. | |
| 5,737,491 A | 4/1998 | Allen et al. | 395/2.79 |
| 5,926,116 A | 7/1999 | Kitano et al. | |
| 5,983,229 A | 11/1999 | Houchin et al. | 707/100 |
| 6,031,497 A * | 2/2000 | Nam | 343/702 |
| 6,038,295 A | 3/2000 | Mattes | 379/93.25 |
| 6,074,111 A | 6/2000 | Kasahara | 400/76 |
| 6,084,911 A | 7/2000 | Ishikawa | 375/240 |
| 6,147,598 A * | 11/2000 | Murphy et al. | 340/426.19 |
| 6,222,985 B1 | 4/2001 | Miyake | |
| 6,223,190 B1 | 4/2001 | Aihara et al. | |
| 6,269,446 B1 | 7/2001 | Schumacher et al. | |
| 6,278,884 B1 * | 8/2001 | Kim, II | 455/556.1 |
| 6,282,362 B1 * | 8/2001 | Murphy et al. | 386/46 |
| 6,304,729 B2 | 10/2001 | Honda et al. | |
| 6,321,158 B1 * | 11/2001 | DeLorme et al. | 701/201 |
| 6,437,797 B1 | 8/2002 | Ota | |
| 6,507,362 B1 | 1/2003 | Akerib | |
| 6,507,371 B1 | 1/2003 | Hashimoto et al. | |
| 6,510,325 B1 | 1/2003 | Mack, II et al. | |
| 6,522,889 B1 | 2/2003 | Aarnio | |
| 6,525,768 B2 * | 2/2003 | Obradovich | 348/231.99 |

(Continued)

FOREIGN PATENT DOCUMENTS

JP 05-122574 Y 5/1993

(Continued)

*Primary Examiner* — Wayne Cai

(74) *Attorney, Agent, or Firm* — Larson Newman, LLP

(57) ABSTRACT

A wireless communication device operable as a digital image capturing device (wireless digital camera) may be used to associate processing information with a captured image. The wireless digital camera may communicate information to a wireless network server, such as a WAP server, and communicate the information in a desirable format to a service request process server. The service request process server may then process the request to provide the service requested by the wireless digital camera.

33 Claims, 6 Drawing Sheets

U.S. PATENT DOCUMENTS

| | | |
|---|---|---|
| 6,526,335 B1 | 2/2003 | Treyz et al. |
| 6,535,243 B1 | 3/2003 | Tullis |
| 6,542,191 B1 * | 4/2003 | Yonezawa ............... 348/333.01 |
| 6,559,882 B1 * | 5/2003 | Kerchner ........................ 348/61 |
| 6,567,122 B1 | 5/2003 | Anderson et al. |
| 6,573,927 B2 | 6/2003 | Parulski et al. |
| 6,628,325 B1 | 9/2003 | Steinberg et al. |
| 6,636,259 B1 * | 10/2003 | Anderson et al. .......... 348/211.3 |
| 6,642,959 B1 | 11/2003 | Arai |
| 6,681,099 B1 * | 1/2004 | Keranen et al. ............ 455/67.16 |
| 6,681,120 B1 | 1/2004 | Kim, II |
| 6,715,003 B1 * | 3/2004 | Safai ............................... 710/33 |
| 6,762,791 B1 | 7/2004 | Schuetzle |
| 6,831,754 B1 | 12/2004 | Delaney |
| 6,930,709 B1 | 8/2005 | Creamer et al. |
| 6,965,398 B2 | 11/2005 | Arakt |
| 6,967,675 B1 | 11/2005 | Ito et al. |
| 6,977,680 B1 | 12/2005 | Ichihara |
| 6,980,232 B2 | 12/2005 | Suzuki |
| 7,013,288 B1 * | 3/2006 | Reifel et al. ................. 705/14.1 |
| 7,062,230 B1 | 6/2006 | Ishiguro et al. |
| 7,076,457 B2 | 7/2006 | Yamamoto et al. |
| 7,111,317 B1 * | 9/2006 | McIntyre et al. ............. 725/105 |
| 7,231,367 B1 * | 6/2007 | Alfvin et al. .................... 705/40 |
| 7,372,485 B1 | 5/2008 | Bodnar et al. |
| 7,701,490 B2 | 4/2010 | Ward et al. |
| 2001/0012000 A1 | 8/2001 | Eberhard |
| 2002/0030745 A1 * | 3/2002 | Squilla et al. ................. 348/207 |
| 2002/0105588 A1 | 8/2002 | Nishimura |
| 2002/0191029 A1 | 12/2002 | Gillespie et al. |
| 2003/0041110 A1 * | 2/2003 | Wenocur et al. .............. 709/206 |
| 2003/0065805 A1 * | 4/2003 | Barnes, Jr. ..................... 709/231 |
| 2003/0142215 A1 * | 7/2003 | Ward et al. ................. 348/207.1 |

FOREIGN PATENT DOCUMENTS

| | | |
|---|---|---|
| WO | WO 99/52259 | 10/1999 |

* cited by examiner

DEVICE, NETWORK, SERVER, AND METHODS FOR PROVIDING SERVICE REQUESTS FOR WIRELESS COMMUNICATION DEVICES

Priority is claimed under 35 U.S.C. Section 119/120 based on filing in the United States for Provisional Patent Application Ser. No. 60/230,339 filed on Sep. 6, 2000.

TECHNICAL FIELD

The present invention generally relates to wireless communications, and more particularly, to a device, network, server and methods for providing service requests for wireless communication devices.

BACKGROUND

Advancements in digital imaging have brought about a need for novel methods for processing digital images. The digital camera, though in its infancy, may nearly replace conventional imaging techniques as advancements in digital imaging and processing proliferate.

SUMMARY

In accordance with teachings of the present invention, network, server and methods for providing service requests for wireless communication devices are disclosed.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The conceptual groundwork for the present invention involves providing service requests for communication devices. A service request may be received by a communication device and processed by a server communicatively coupled to the communication device. The server may process the service request and communicate information to the communication device upon determining availability of the service.

In a particularized form, a wireless communication device operable as a digital image capturing device (wireless digital camera) may receive a service request via a user interface. The wireless digital camera may determine the requested service and wirelessly communicate information associated with service requested to a service request process server operable to process the service request for the requesting device. Upon determining availability of the service, the service request process server may communicate information to the wireless digital camera associated with providing the service.

For example, a user may order exposures for a wireless digital camera. The wireless digital camera may receive an input via a user interface and process the request based upon the input. The wireless digital camera may then wirelessly communicate the request to a server operable to process the request for additional exposures. For example, the server may identify the wireless communication device and the number of requested exposures. The server may then determine payment information associated with the request and request payment for the requested exposures. Upon determining authorization of payment, the server may then communicate information to the initiating wireless digital camera such that the wireless digital camera may be programmed for the authorized exposures. In this manner, a user may request additional exposures for a wireless digital camera and pay for the requested exposures in an automated and efficient manner.

Figure 1:
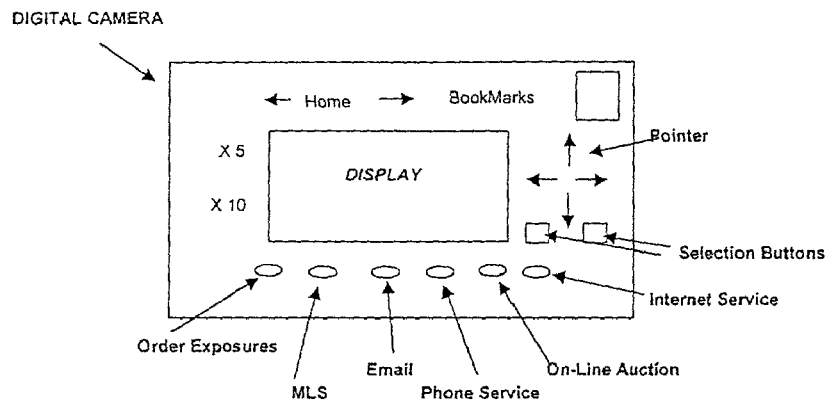
FIG. 1 illustrates a diagram of a digital camera operable to request services according to one aspect of the present invention.

FIG. 1 illustrates a diagram of a digital camera operable to request services according to one aspect of the present invention. A digital image capturing device (digital camera) is shown generally in FIG. 1 and may include a display such as an active matrix, LCD, or the like operable to display information such as digital images, text, web pages, etc., an input device such as a pointing device, selection buttons, magnification selection buttons for a captured image, and network browsing buttons for navigating a network such as the Internet.

The digital camera may also include pre-programmed and/or programmable service request buttons for requesting services. Some services may include ordering exposures, requesting MLS listings, requesting email service, requesting Internet service, requesting phone service, on-line auction service or other services which may be requested by the digital camera illustrated in FIG. 1.

Though illustrated as physical programmable buttons, the process references may be provided using a user interface operable to be displayed with the display. The user interface may display service request references within a menu, as icons, or within other user interfaces or programs which may be associated with providing requests for services.

In one embodiment, the digital camera may include an order exposures service request button for ordering exposures for capturing and processing digital images. For example the digital camera may be programmed to provide a prepaid number of exposures. During use, a user may capture digital images and select a digital image for traditional print processing. Digital information associated with the captured image may then be communicated to a server operable to process the communicated digital information into traditional prints. When a user uses all of the available exposures (e.g. a counter associated with the number of prepaid exposures is exhausted), the user may request or order additional exposures and processing by selecting the order exposure service request button associated with the digital camera. The digital camera may then communicate with a server operable to process the request and provide information associated with reprogramming the digital camera with additional exposures as required.

In another embodiment, a user may select an multiple listing service (MLS) service request button associated with the digital camera. As such, the digital camera may communicate with a server operable to determine availability of an MLS listing service and communicate information to the digital camera based upon determining availability of the service. For example, a user may want to access an MLS listing entry for a specific property. As such, the server may determine the availability of information associated with the request and communicate information associated with the request to the digital camera.

In one embodiment, the digital camera may access a global position reference associated with the location of the digital camera. As such, the user may select the MLS service request button and information associated with the global position of the digital camera may be provided to a server operable to process the service request having an associated GPS reference. For example, the server may determine the availability of MLS listings for the location associated with the digital camera. The server may determine the GPS location of the digital camera and a property listing associated with the determined location. As such, MLS information (i.e. price, size, number of bedrooms, taxes, etc.) associated with the property listing may be communicated to the digital camera for the user to view. In one embodiment, a graphical map may be provided and displayed within the display representing the location of the MLS listing. For example, a graphical representation of the map may include one or more listings within a certain region identified using the global position location and MLS listing. In this manner, a user may browse or locate other properties proximal to the digital camera's global position location using the MLS service request function button.

In one embodiment, the digital camera may include a email service request function button. For example, a user may want to access an email account operably associated with the digital camera and accessible by the user. Through selecting the email service request function button, the digital camera may communicate with a server operable to request email service for the digital camera. As such, upon determining availability of email service, information associated with providing email service may be communicated to the digital camera. For example, information associated with unread emails may be communicated to the digital camera thereby allowing a user to read emails, respond to emails, draft emails, send emails, etc.

In another embodiment, the digital camera may include a phone service request button for requesting phone service. For example, the digital camera may be operable as a wireless or cellular telephone. As such, the digital camera may request phone service with a server operable to process the phone service request. Upon determining availability of service, a user may use the digital camera to place a telephone call to a second party, retrieving voice mail, receiving phone calls, etc.

In another embodiment, the digital camera may include an Internet service request button for requesting access to a network such as the Internet. For example, the user may want to access the Internet and browse the Internet using the digital camera. The digital camera may include browsing software operable to provide a user access to the Internet in a browsing environment. As such, a service request may be processed by a server operably associated with providing the user access to the Internet. Upon determining availability of access, the server may communicate information to the digital camera associated with processing the Internet Service request.

In another embodiment, the digital camera may include an on-line auction service request button for providing a user access to an on-line auction such as an Internet based auction. The user may select the on-line auction function button and the digital camera may communicate the request to a server operable to determine availability of an on-line auction. Upon determining availability, the server may then communicate information for to the digital camera in association with determining availability.

In one embodiment, a user may capture a digital image and select the on-line auction service request button for offering property displayed within the digital image for auction at an auction website. The user may capture an image and provide information (i.e. sale price, description, category, etc.) for the property using the digital camera. For example, the digital camera may display a user interface which may allow a user to enter a price and description using the scroll buttons coupled to the digital camera. In this manner, a user may upload images of property and associated auction information without having to access the Internet using a personal computer.

In one embodiment, information for items to be listed or provided for an on-line auction may be communicated to a server operable to provide the user of the digital camera access to an on-line auction. In one embodiment, personal information of the digital camera user may be stored within a server associated with the digital camera. As such, a user may communicate information for purchasing or selling an item and a user's profile information (i.e. name, address, phone number, email address, delivery information, payment information, etc.) may be appended to the request as needed.

For example, a user may want to enter an item to be auctioned at an on-line auction. As such, a user may enter a price associated with a captured image and communicate the information to a server operable to process the communicated information. The server may then append the image and selling price to include a user's email address and delivery information for the item for sale. Additionally, the user's name and address may be provided to the 'host' of the on-line auction for processing the property being offered within the auction. In this manner, a transaction for the sale of an item may be automated using the provided information associated with the user of the camera.

In one embodiment, a user may select the on-line auction service request button to access current items listed or displayed within an auction website. For example, a user may browse items which may be auctioned and place a bid on items as desired. As such, information associated with the user of the camera may be provided to the auction website and used in association with purchasing an item. For example, payment information, delivery information, name, address, etc. may be associated with the digital camera and provided to the host of the on-line auction for performing the purchase transaction. In this manner, minimal input may be required by the user for purchasing items at the on-line auction or other websites which may be accessible by the digital camera and offering goods or service for purchase.

The digital camera illustrated in FIG. 1 may record a digital image as light passes through a lens operably associated with the digital camera in a similar manner to a regular camera. However, instead of being focused on photographic film, the image is focused on a chip called a charge-coupled device (CCD) operable as an image sensor (CMOS sensors or other sensors may also be used). The top of the CCD may include transistors that create electrical currents in proportion to the intensity of the light striking them. The transistors make up the pixels of the image and a pixel is the minimum, distinct visual piece of information that a component can display or capture. The pixel can be made up of only one transistor for black and white photography or several transistors for color. The more pixels in an image, the better the resolution. The transistors create a continuous, analog electrical signal that goes to an analog-to-digital converter (ADC). The ADC is a chip that translates the varying signal to a digital format, which consists of a continuous stream of 1's and 0's.

The ADC sends the digital information to a digital signal processor (DSP) that may be programmed specifically to create photographic images. The DSP may adjust the contrast and detail of the image and compress the image information (i.e. JPEG, device specified, etc.) such that the image may take up less storage space within the digital camera's storage medium such as volatile RAM, an internal disk drive, flash memory chip, or other memory devices operable to store the image information.

The digital camera further includes a communications module operable as a wireless communications module which may wirelessly communicate information to a network operable to communicate with digital camera. For example, the communications module may be operable to wirelessly communicate information using one or more types of wireless communication, as described below.

The digital camera may include one or more processors operable to process image information. For example, digital camera may include an image processor operable to record digital and a communication processor operable to communicate image information and associated process information. The processors may be integrated as a single chip or as a "system-on-a-chip" for communicating image information having associated process information.

In one embodiment, the communications module for the digital camera may include a code division multiple access and advanced mobile phone system (CDMA/PCS/AMPS) cellular technology for wirelessly communicated digital information. Qualcomm's Mobile Station Modem (MSM™) chipset and system software may include a MSM3300 single-chip baseband processor modem that interfaces directly with the IFR3300™, RFR3100™ and RFT3100™ chips, and the PM1000™ power management chip. The MSM3300 chipset and system software may include advanced technologies such as global position location and Bluetooth, as well as multimedia features such as Qtunes™ MP3 player software and Compact Media Extension (CMX™) MIDI based multimedia software. The MSM3300 device integrates both digital and analog functions on a single chip. The low-power, low-cost MSM3300 includes an ARM7TDMI™ RISC microprocessor, and Qualcomm's powerful QDSP2000™ digital signal processor core.

The MSM3300 and associated chipset includes a MSM3300 modem, a RFT3100 analog-baseband-to-RF upconverter, a IFR3300 IF-to-baseband downconverter, a RFR3100 RF-to-IF downconverter and a PM1000 power management ASIC. During use, the MSM3300 performs baseband digital signal processing and executes the subscriber unit system software and serves as the central interface device in the subscriber unit, connecting RF and baseband circuits as well as memory and user interface features. The MSM3300 device also includes complete digital modulation and demodulation systems for both CDMA and AMPS cellular standards as specified in IS-95A and IS-95B. The subscriber unit system software controls most of the functionality and activates the features of the subscriber unit. System software is executed by an embedded ARM7TDMI microprocessor within the MSM3300 device.

The digital camera may further include global positioning capabilities for providing location information for the digital camera. One such technology may include Qualcomm's gpsOne™ Technology which may be associated with the MSM3300 Chipset. The gpsOne position location technology merges Global Positioning System (GPS) satellite and network information. The digital camera utilizing a GPS module such as gpsOne collects measurements from a GPS constellation and a cellular/PCS network and sends the information to the Position Determination Entity which optimizes the position location calculation based on existing information.

The digital camera may also include a Bluetooth wireless communication module. Bluetooth is a Global Specification for Wireless Connectivity and allows replacement of various cables that connect one device to another using a universal short-range radio link. For example, Bluetooth radio technology built into both a cellular telephone and a laptop would replace the cumbersome cable used today to connect a laptop to a cellular telephone. Printers, PDAs, desktops, fax machines, keyboards, joysticks and virtually any other digital device can be part of the Bluetooth system. In addition to untethering devices by replacing the cables, Bluetooth radio technology provides a universal bridge to existing data networks, a peripheral interface, and a mechanism to form small, private ad hoc groupings of connected devices away from fixed network infrastructures. The Bluetooth air interface is a frequency-hopping Gaussian Frequency Shift Keying (GFSK) modulation in the unlicensed 2.4 GHz ISM band. The modulation rate is 1 Mbps, and its architecture offers a low-cost, simple radio solution.

The Bluetooth baseband functionality may be incorporated into the digital camera device and may be operable to CDMA baseband processing to facilitate dial-up networking with a global network such as the Internet.

In another embodiment, the digital camera may include Qualcomm's Wireless Internet Launchpad™ for providing a broad range of applications and Internet services, including digital audio and video, connectivity, position location, user interface and removable storage functionality.

The digital camera may also include Universal Serial Bus (USB) for faster data transfers between wireless communicators and other data devices. The digital camera may be operable to use voice recording software such as Qualcomm's PureVoice Mail™ for sending voice email attachments to desktop computers and other devices Internet Protocol (IP) stack support and Wireless Application Protocol (WAP) browser interface for full Internet connectivity. The digital camera may also include a User Interface PureVoice VR™ speaker-dependent and speaker-independent Voice Recognition for providing voice commands for digital camera functions and features.

The digital camera may also include an interface card such as Qualcomm's Subscriber Identity Module/Removable Universal Identity Module (SIM/RUIM) card interface allowing compatibility with third-party PDA operating systems and applications. The digital camera may use a Java Digital CMOS Image (DCI) sensor for image capture and a Color Liquid Crystal Display (LCD) driver to allow viewing of both still and moving images in full color. A Storage Multimedia Card (MMC) interface, enabling addition of high-capacity removable memory for storage of data such as electronic maps, music and images, as well as for transfer of data to and from PCs and consumer devices.

As stated above, a user may wirelessly communicate with a network such as the Internet using the digital camera. The digital camera may be operable to receive and communicate wireless information operable to provide access to the Internet. Such communications may include using a WAP operable to wirelessly communicate information associated with the Internet. The user may navigate using the forward button, back button, home button, favorite button, etc. operable to allow a user to navigate the Internet. Information associated with the Internet may be communicated to the digital camera using the WAP for the digital camera.

The digital camera may further include software and hardware operable to allow a user to browse the Internet and access selective information in a desirable manner. For example, a user may access a website operable to receive information representing digital images. A user may preview the images and communicate desirable images to a website operable to receive information representing the recorded images. In this manner, a user may be able to process the communicated information (i.e. print photos, request photo processing, email information, etc.) without having to access the Internet via a computer or hard-line, landline, etc.

In one embodiment, the digital camera may be programmed or re-programmed for additional/updated functionality. For example, a new service or information associated with a current or existing service, may be wirelessly communicated to the digital camera and stored within memory associated with the digital camera. In this manner, the digital camera may be remotely reprogrammed expanding/updating the functionality of the digital camera thereby enabling the digital camera to be configured or re-configured as needed.

In one embodiment, a service request may be communicated to a network for processing via a land-line, wire-line, etc. modem operably associated with the digital camera. For example, wireless service may not be available for processing, a service request. As such, the digital camera may be operable to communicate in a client-server based mode for requesting and/or processing service requests.

In one embodiment, one or more separate components may be used to provide communication for requesting a service. For example, a communication module operable to communicate information via a network may be operably coupled to the digital camera for communicating a service request. For example, a communication module may be coupled to a communication port, such as a USB port, operably associated with a digital camera. In this manner, the digital camera of FIG. 1 may be realized using an external communication module operable to request and/or process a service requests.

Figure 2:
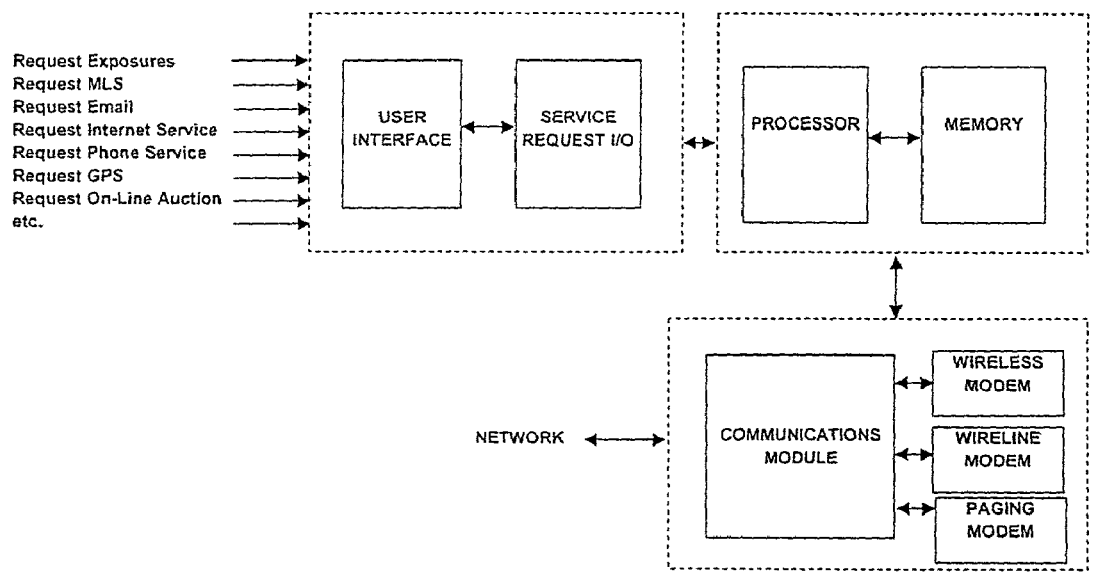
FIG. 2 illustrates a block diagram of a communication device operable to provide a service request according to one aspect of the present invention.

FIG. 2 illustrates a block diagram of a communication device operable to provide a service request according to one aspect of the present invention. The communication device may be used in association with the digital camera illustrated in FIG. 1 or other devices or systems which may use the device illustrated in FIG. 2.

The communication device includes a user interface module operable to display and receive information, a processor module operable to process service requests, and a communication module operable to communicate information associated with requesting a service. During use, a user may select a service by selecting a service request function button associated with the user interface. The user interface module may detect the input and communicate the service request via the service request I/O port to the processor module. The processor module may receive the input for the service request and process the service request based upon the selected service. For example, the processor may identify the reference and execute a program of instructions stored with the memory and associated with the requesting a specific service. As such, the program of instructions may be executed for requesting the service. For example, the program of instructions may request communication module to communicate with a specified network location operable to determine availability of the requested service. The communication module may then initiate communication with the network location and communicate information associated with requesting a service to the network location.

For example, if a user wanted to order exposures for a digital camera, the communication module may communicate a device identifier and the number of exposures requested by the user. As such, a network location operable to receive the request may determine if the user may request additional exposures for the specific digital camera. The server may then communicate information to the communication module indicating whether the service will be provided. For example, a user's credit card may be used to order exposures. As such, the communication module may receive information confirming an authorized transaction allowing the processor module to reprogram the digital camera as required.

In one embodiment, the communications module may include one or more communication devices, such as communication modems, operable to communicate information associated with requesting a service. For example, the communication module may include a wireless modem, such as a xCDMA or high data rate modem, and a conventional landline modem, such as a 56K Flex modem. As such, a communication device may communicate wirelessly or via a wireline with a network for processing service requests.

In another embodiment, the communication module may include a paging system modem, such as Motorola Inc.'s ReFlex modem operable to communicate with one or more paging networks. Paging networks are known in the art and may be operable to communicate relatively small amounts of data between a wireless device and a wireless network. For example, requests and confirmation for ordering exposures for a digital camera may take advantage of using inexpensive paging services and components for requesting and/or ordering exposures for a digital camera. In a similar manner, a service request, such as an MLS listing service request, email service request, GPS service request, etc. may utilize the paging network to request a service. Upon determining the availability of the service, information associated with providing the service may be communicated to the network using the paging network, a high speed data network, or a combination of both as needed.

Figure 3:
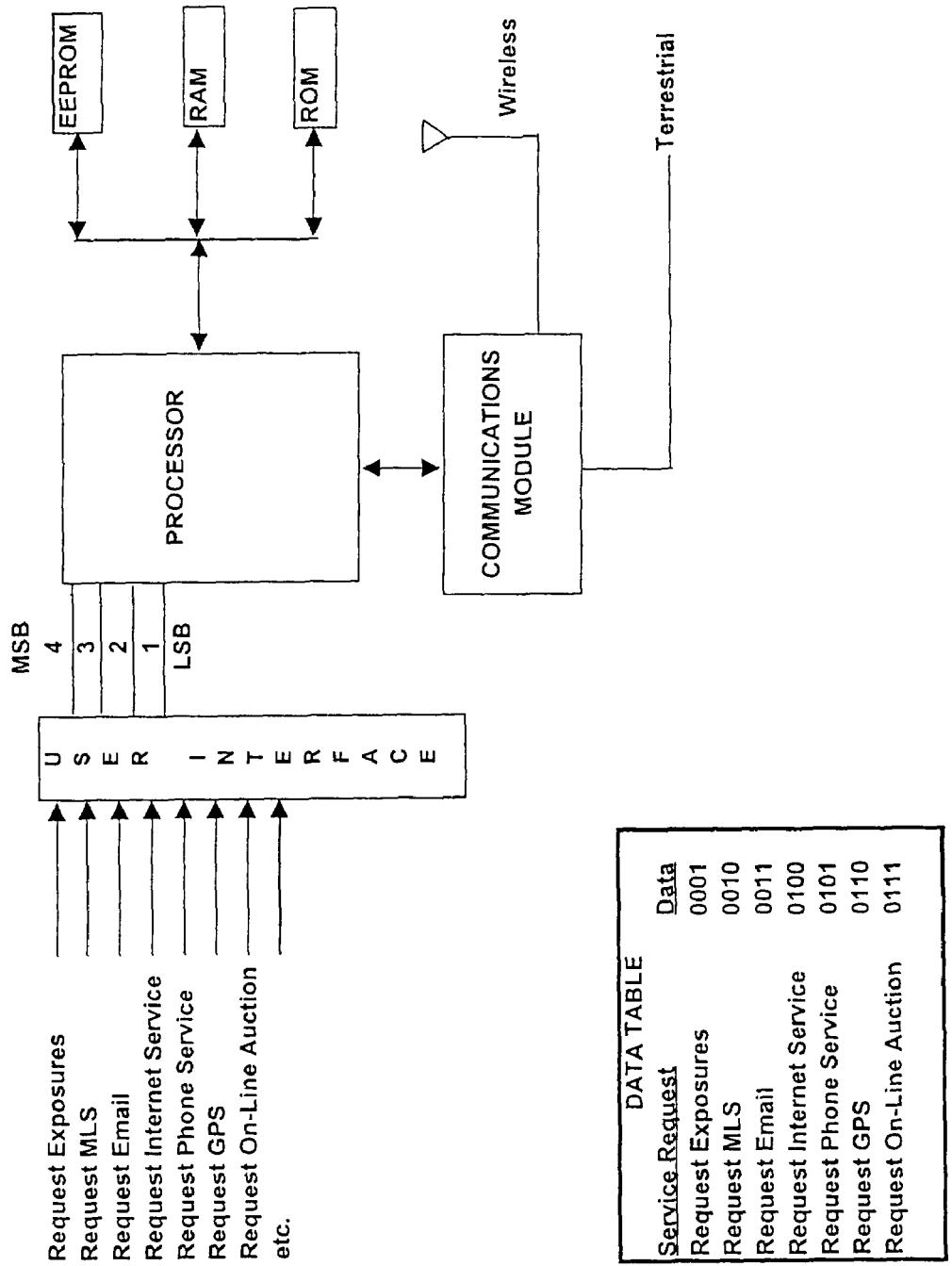
FIG. 3 illustrates a schematic diagram of communication device operable to provide a service request according to one aspect of the present invention.

FIG. 3 illustrates a schematic diagram of communication device operable to provide a service request according to one aspect of the present invention. The communication device may be used with the digital camera illustrated in FIG. 1 or other devices or systems operable to use the communication device illustrated in FIG. 3.

The communication device includes a user interface operable to provide a service request and communicate the service request to a processor, such as an embedded processor, a reduced instruction set co-processor, a RISC processor, an HC11 processor, a Intel based processor or other processors operable to process information associated with requesting a service. The user interface may be coupled to one or more function buttons operable to request a service such as ordering exposures, requesting MLS service, etc. Each function button may have a unique address associated with the function such that upon a user selecting a function button, a data line coupling the user interface and the function button may provide a signal to the user interface. The user interface may then translate the input into a format to be provided to the processor for processing. In one embodiment, the service request buttons may be physical function buttons operably coupled to the user interface for providing a service request. However, other embodiments for providing service requests using a user interface may include displaying icons or graphics associated with selecting a request for service. For example, an operating system for a digital camera may include a user interface having selectable references for selecting service requests. As such, the user interface may detect an input by a user for selecting a service request.

The processor may be coupled to the user interface via a plurality of data lines operable to be used with identifying a requested service. For example, the processor may receive an input that a user has requested a service and the user interface data lines may be read by the processor to determine the requested process. The Data Table in FIG. 3 illustrates one embodiment for providing data to a processor for determining a selected process.

The communication device may further include a plurality of memory devices for storing information. For example, the processor may access a look up table stored within ROM or EEPROM for the data communicated by the user interface for identifying a service request. As such, the processor may further access a program of instructions associated with a process and load the program of instructions within RAM. The processor may then execute the program of instructions associated with the service request for processing the requested service.

The communication device further includes a communication module for communicating information to a server operable to process the requested service. The communication module may include a wireless data modem, a paging modem, a global position modem, a wireline modem operable to communicate with a terrestrial network, or other modems operable to communicate information associated with processing a service request. The communication module may use also one or more modems for communicating information to a server. For example, the communication modem may communicate small amounts of data via a paging network to the server and larger amounts of data via a cellular network. In this manner, the communications module may be operable to minimize cost associated with wirelessly communicating information associated with processing a service request.

In another embodiment, wireless service may not be available for communicating service requests. As such, the communications module may be operable to communicate information associated with a service request in a client-server mode via the Internet using a terrestrial communication medium such as a twisted pair, a digital subscriber line, a cable medium, or other terrestrial mediums for communicating information between a client device and a server.

During use a user may request a service by selecting a service request function button operably associated with a communication device. For example, a user may select an on-line auction service request function button. The user interface may detect the selection and send a signal to the processor indicating that a service request button has been selected. The user interface may then translate the on-line auction request (i.e. '0111') and communicate the data to the processor. The processor may then access a look-up table stored with ROM or EEPROM and associated with processing service requests. The processor may then load a program of instructions associated with requesting an on-line auction into RAM and execute the program for providing the request. The program of instructions may communicate information to the communications module for requesting on-line auction access. The communications module may request service via a paging network and a server may process the request accordingly. The communications module may receive conformation of the service from the server and provide the processor a confirmation for accessing an on-line auction. The processor may then process information associated with an on-line auction.

For example, a user may want to provide an image and associated description information (i.e. class, opening bid, description, etc.) for an item to be auctioned at the on-line auction. As such, the processor may communicate image information and the associated description information to the communication module where the information may be communicated to a server and processed.

Figure 4:
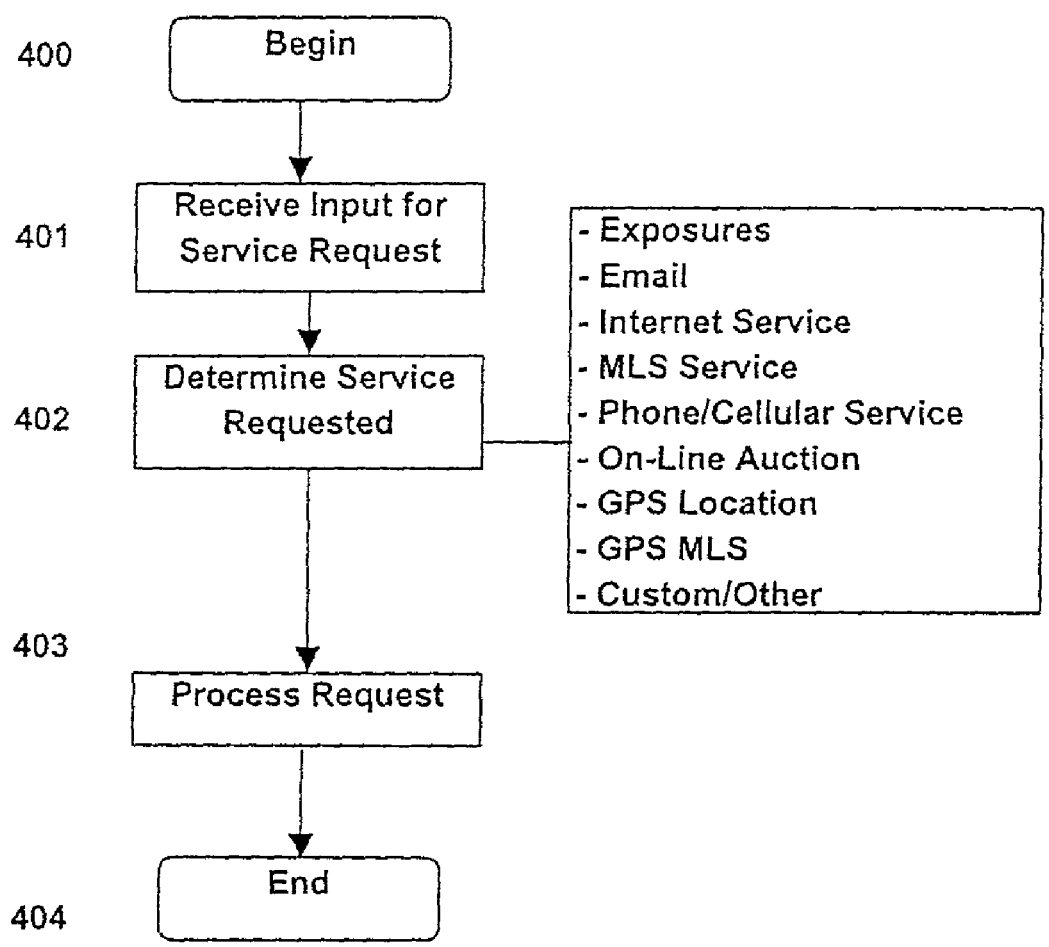
FIG. 4 illustrates a method for processing a service request according to one aspect of the present invention.

FIG. 4 illustrates a method for processing a service request according to one aspect of the present invention. The method may be used by the devices illustrated in FIGS. 1 through 3 or other devices operable to deploy the method of FIG. 4.

The method begins generally at step 400. At step 401a device, such as a digital camera, receives an input requesting a service. The input may be provided using a user interface such as a function button, a graphical user interface such as an icon provided within a display, or other user interfaces operable to receive an input for processing a request. In one embodiment, the input may be an automated input initiated by a program associated with the device. For example, upon a user utilizing the last exposure associated with the digital camera, a program of instructions associated with the digital camera may detect that the last exposure was used. As such, an input may be provided to the method illustrated in FIG. 4 in response to detecting the last exposure being used.

Upon receiving an input, the method proceeds to step 402 where the method determines the service being requested. Services may include, but are limited to, ordering exposures, requesting email service, requesting Internet service, requesting MLS listings, requesting phone service, requesting access to an on-line auction, requesting a global position location, requesting an MLS listing based upon a GPS location, or other services including customized services operable to be requested by the method of FIG. 4.

Upon determining the service, the method proceeds to step 403 where the method processes the request. For example, the method may access information stored within memory and associated with requesting service. The information may include a device identifier identifying the device and a service identifier identifying the type of service being requested. For example, the information may be included within a binary encoded word operable to identify the service being requested. The binary encoded word may be configured as follows:

(MSB) Bit 1=Order Exposures
Bit 2=Request MLS listings
Bit 3=Request Email Service
Bit 4=Request Internet Service
Bit 5=Request Phone Service
Bit 6=Request GPS location
Bit 7=Request On-Line Auction
(LSB) Bit 8=NOT USED As such, a binary encoded word or reference may be used to request one or more services for a communication device. For example, the word '11100010' may be provided for ordering exposures, requesting MLS listings, requesting email service, and requesting access to an On-line auction. Other references may also be used in association with several other industries other than real estate and may include, but is not limited to, property appraisal service, automobile listing service, insurance service, law enforcement service, and other industries which may benefit from the method of FIG. 7.

A reference associated with requesting one or more services may then be communicated to a server for processing the service request. In one embodiment, through providing a device identifier, the service request process server may identify functionality or services which may be available for a specific communication device. For example, a server may include a database of devices having listings of information associated with a particular device. As such, a service request device identifier may be used for requesting service thereby reducing the amount of information required to process a service request while saving valuable communication or airtime associated with wirelessly communicating information.

Figure 5:
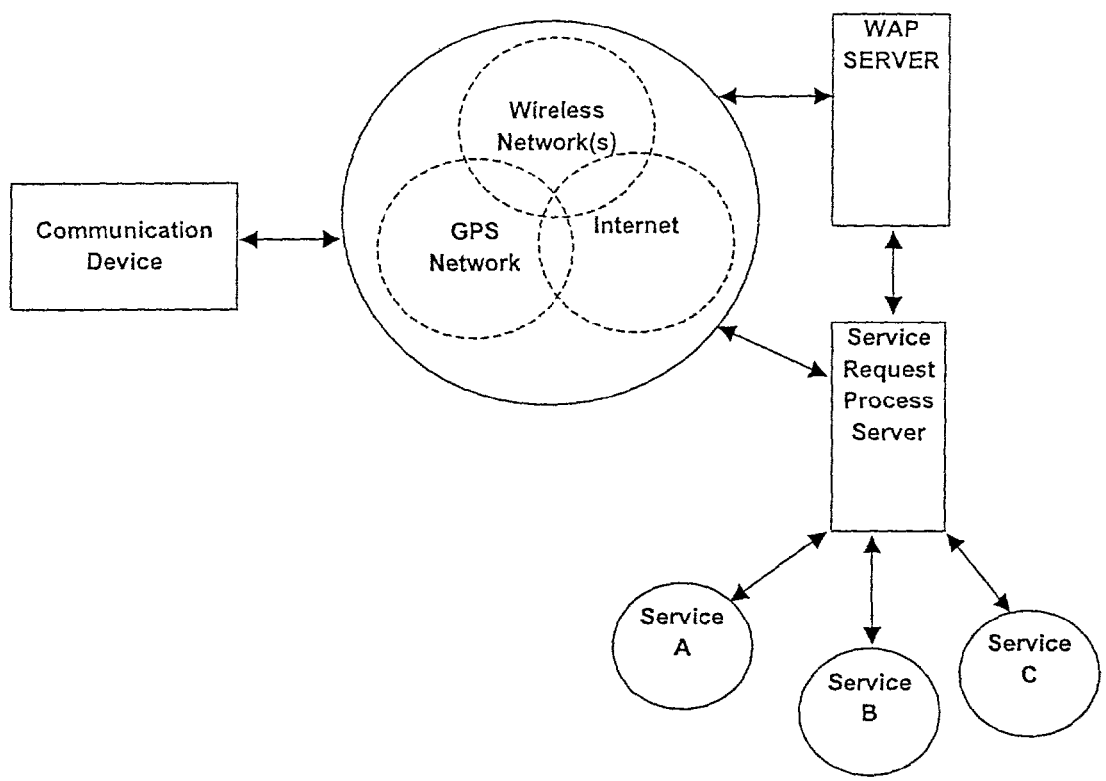
FIG. 5 illustrates a communications network operable to communicate information associated with processing service requests according to one aspect of the present invention.

FIG. 5 illustrates a communications network operable to communicate information associated with processing service requests according to one aspect of the present invention.

The network includes a communication device which may be communicatively coupled to one or more networks such as a wireless communication network, the Internet, an Intranet, a paging network, a GPS network or any combination of networks accessible by a communication device. The network further includes a wireless application protocol server operable to process information communicated between a network, such as the Internet, and a wireless communication device. The WAP server may also be coupled to a service request process server (SRPS) operable for communicating information between the SRPS and a communication device. The SRPS may be operable to communicate with one or more network and may deploy one or more processes for processing a service request.

During use, a communication device such as a digital camera may request a service via a wireless communication network. The digital camera may communicate information from to the SRPS via a network such as the Internet. The SRPS may then identify the digital camera and the process requested by the digital camera. The SRPS may then deploy a process, either resident on the SRPS or remote to the SRPS, for processing the requested service. Upon processing the requested service, the SRPS may then communicate information to the requesting device in response to providing the requested service.

For example, a user may request exposures for the digital camera via a wireless communication network such as a paging network. The WAP server may receive the request via the paging network and communicate the request including a device identifier to the SRPS. The SRPS may then process the service request and communicate information to the digital camera via the paging network confirming the ordering of exposures.

As stated above, the network may include a wireless application protocol (WAP) enabled server operable to receive wirelessly communicated information communicated via a wireless network using a WAP enable device. For example, a digital camera may be a WAP enabled device operable to communicate information via a wireless network using WAP and a WAP enabled server. The digital camera may communicate information via the WAP server to a service request process server operable to process information associated with processing a service request.

In one embodiment, the WAP server and the process server may be realized as a single server. As such information associated with requesting a service may be wirelessly communicated to the single server for processing the image information.

In another embodiment, the WAP server may not be needed for processing and/or requesting service requests. For example, the digital camera may communicate with the service request process server directly using a wireless communication protocol operable to communicate information to a the service request process server without having to translate the communicated information into a format (i.e. TC/IP format) operable to be used by a network such as the Internet. For example, xCDMA technologies format data in packets such that information may be communicated directly to a global communications network such as the Internet. As such, the digital camera operable to communicated information using CDMA may packetize information for the service request and communicate information directly to a service request process server without having to use a WAP server.

In another embodiment, the service request process server may be operable to store information associated with requesting a service. For example, the service request process server may include a database for storing information for a plurality of digital cameras for processing service requests. Additionally, a digital camera may communicate information associated with processing a service request and the server may store the information within the database for the specific device. As such, the server may process the service request using the information stored within the server.

In one embodiment, a network location may convert the information into a format operable to provide conventional photographs representing the recorded digital images. In another embodiment, the information may be forwarded as an email to an email address accessible by the network. In another embodiment, the images may be stored at a network location for future access by one or more users.

In one embodiment, the network may be operable to provide a website for wirelessly communicating information associated with digital images and may be operable to use Java based objects for improved navigation, appearance, and functionality of the website. Java is an object oriented language which may be executed by a Java interpreter and run on most computers and operating systems such as UNIX, Macintosh OS, and Windows. Additionally, the network may be operable to utilize many different types of markup languages for accessing, providing, and/or communicating information associated with digital images. Markup languages may include, for example, hyper text mark-up language (HTML), extensible mark-up language (XML), wireless mark-up language (WML), etc. which may be used in association with various communication protocols such as Internet Protocol (IP), Transmission Control Protocol (TCP), Transmission Control/Internet Protocol (TC/IP), Wireless Application Protocol (WAP), etc. for communicating image information and/ or associated references for processing images.

For example, the network may be operable to use TCP/IP and/or WAP communication in which a client terminal, such as wireless communication device, requests service (such as sending a Web page) by another computer, such as a server coupled via the network. In this manner, information associated with digital images may be communicated using TC/IP communication and/or WAP.

In another embodiment, image information having an associated process reference may be communicated via a landline, wire-line, etc. For example, a digital image may be uploaded via a modem coupled to a phone jack, network connector, cable connector, etc. operable to communicate with a network such as the Internet. As such, the method may receive a request for a service via a land line and process the request accordingly.

In other embodiments, service requests may be associated with various processing such as real estate processing, appraisal processing, insurance processing, surveyor processing, electronic communication processing, car listing processing, website/webinfo update processing, traditional print processing, customizable or user defined processing, on-line auction processing, or other processes which may be used in association with capturing image information and associating a reference for processing the image information.

Figure 6:
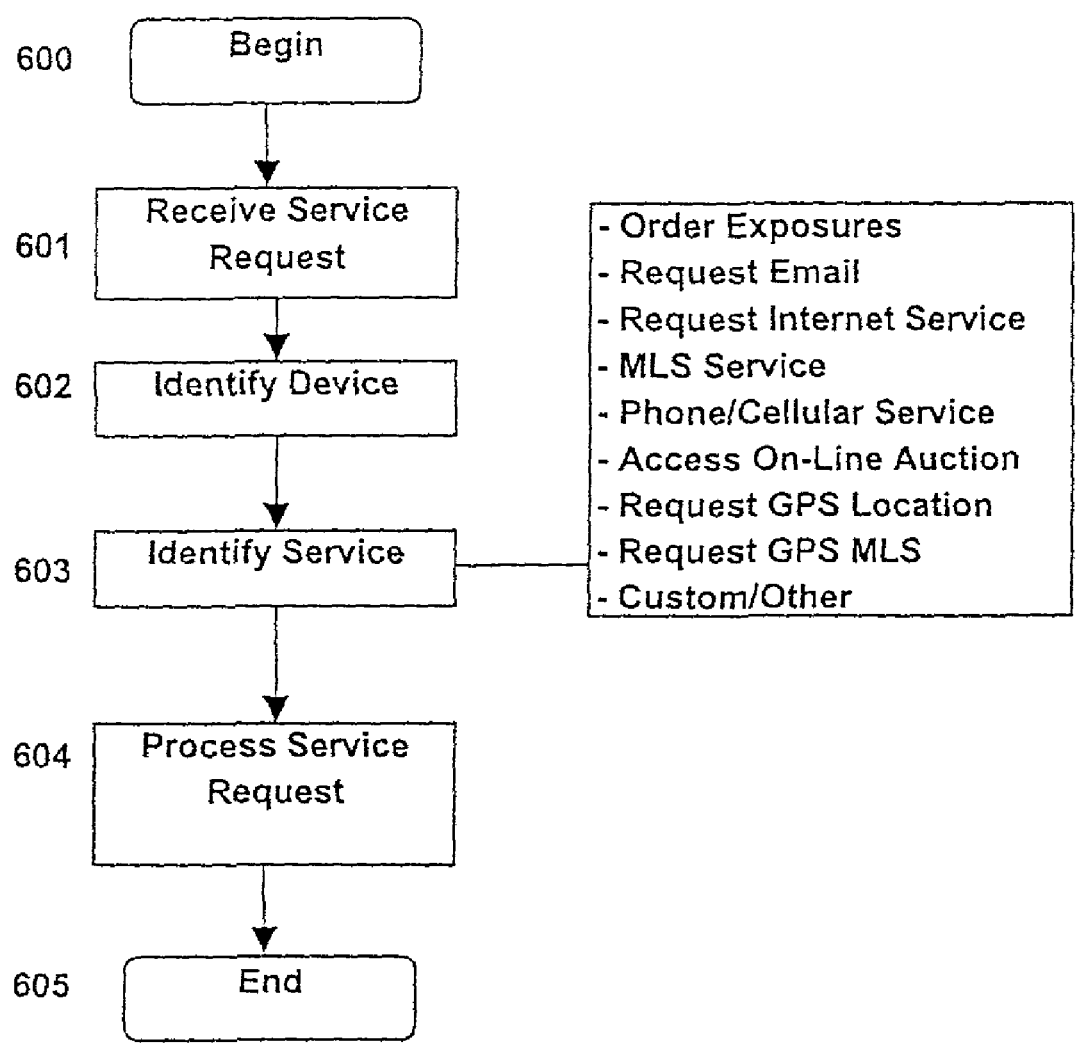
FIG. 6 illustrates a method for processing a service request via a process server according to one aspect of the present invention.

FIG. 6 illustrate a method for processing service requests via a process server according to one aspect of the present invention. The method may be used in association with a program of instructions operable to be deployed by the network illustrated in FIG. 5 or other networks operable to deploy the method of FIG. 6.

The method begins generally at step 600. The method proceeds to step 601 when a service request is received. For example, a wireless communication device may communicate a service request via a wireless network, such as cellular network, to a server communicatively coupled to the cellular network. As such, the server may receive information associated with providing service for the wireless communication device. Upon receiving the request, the method proceeds to step 602 where the method identifies the device requesting the service. For example, a wireless digital camera may include a device identifier associated with identifying the digital camera, the camera's user, functionality of the camera, user profile information, transactional information and/or other information which may be associated with a wireless communication device. In one embodiment, a database, such as an SQL database, may include a listing of communication devices and associated device information for each specific communication device. As such, the method may access the database and identify the device and associated information.

Upon identifying the device, the method proceeds to step 603 where the method identifies the service being requested. For example, the communication device may request one or more services which may be determined by the method. The services may include, but are not limited to, ordering exposures, requesting email service, requesting Internet service, requesting MLS listings and/or service, requesting access to an on-line auction, requesting GPS locations, requesting MLS listing based on GPS locations, or other services such as customized services which may be used by the method of FIG. 6.

In one embodiment, information associated with a communication device may be structured in a predetermined manner for identifying the service being requested. For example, a data word may be provided in association with the communication device for identifying one or more services being requested. As such, the method may determine the service being requested based upon the bits within the data word.

In another embodiment, the method may access a database having several fields for the identified device. As such, the database may include a structure identifying the services offered for a specified device. For example, a communication device may have specific functionality which may not be standard on all communication devices. Upon identifying the device the method may determine the functionality of the device and further identify a service based upon the available services for the identified device. In this manner, each device may be customized for different sets of functions or service requests while utilizing a substantially similar data word for requesting a service. As such, communication of information for requesting services may be standardized amongst communication devices thereby using the server to identify services for specific devices while reducing customization required for a communication device.

Upon identifying a service request, the method proceeds to step 604 where the service request may be processed. For example, the method may identify a service request and a network location associated with processing the service request. As such, the method may access a network location operable to process the service request and provide information associated with the communication device as needed. For example, a user may want to access an MLS listing based upon a GPS location of the communication device. As such, the method may determine a GPS location associated with the communication device and provide the GPS location to a process operable to determine an MLS listing based on the GPS location. For example, the method may communicate with a program operable to map GPA locations to street address locations. Additionally, the program may map the determined street address to an MLS listing listed within an MLS database for a property. As such, the MLS listing for the GPS location may be provided for the communication device. Additionally, MLS information may then be communicated to the requesting device thereby providing a user an MLS listing based on a GPS location. In a similar manner, additional MLS listings proximal to the communication device may be processed and communicated to the communication device.

Upon processing the service request, the method proceeds to step 605 where the method ends. In this manner, services may be requested and provided for communication devices.

Figure 7:
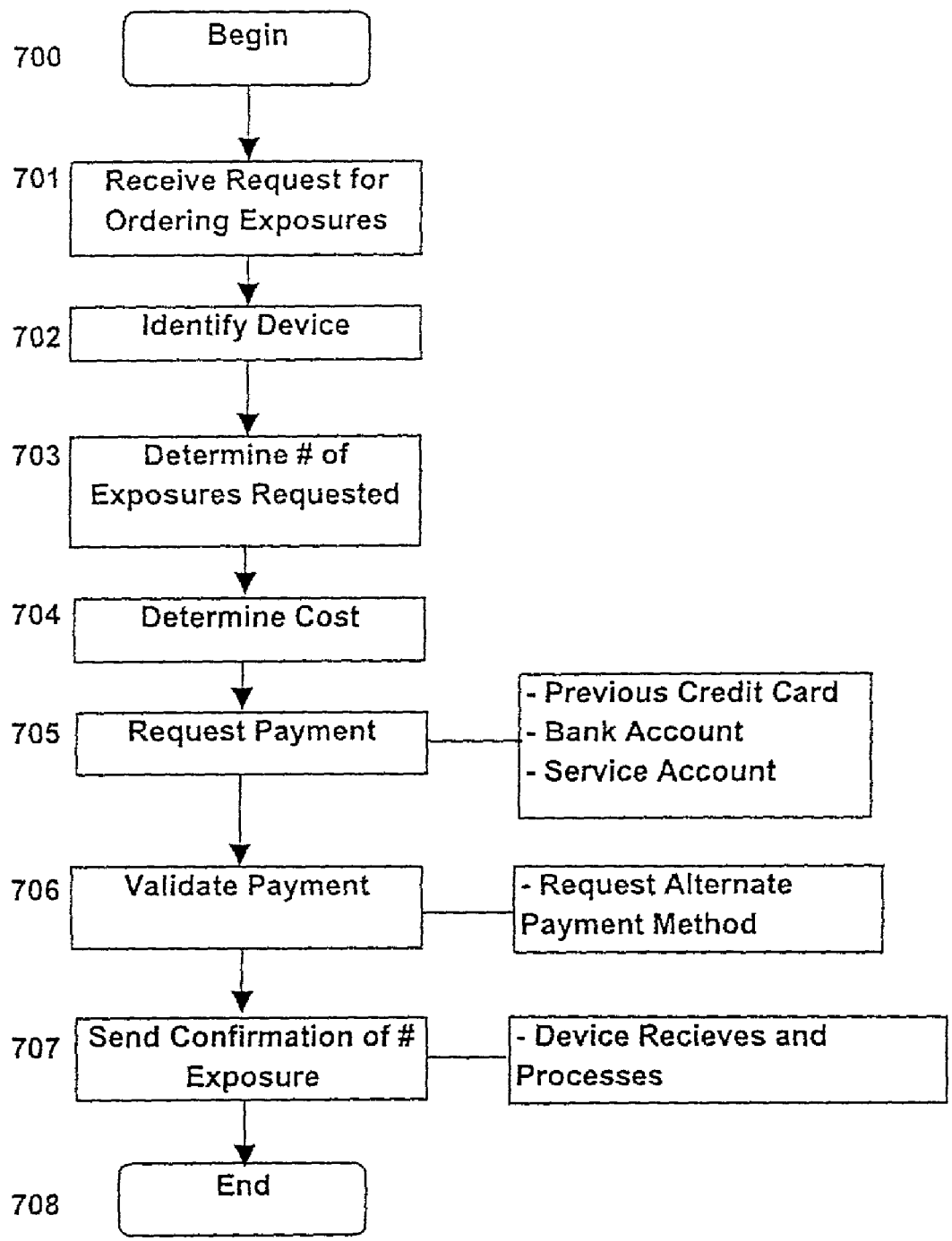
FIG. 7 illustrates a method for processing service request for ordering exposures according to one aspect of the present invention.

FIG. 7 illustrates a method for processing service request for ordering exposures according to one aspect of the present invention.

The method begins generally at step 700. The method proceeds to step 701 when a request for ordering exposures is received. For example, a digital camera operable to request exposures and processing of digital images may be received. Upon receiving a request for exposures, the method proceeds to step 702 where the method identifies the device. For example, device identification information may be included within a header of a datapacket communicated by the digital camera. As such, the header may be used to identify the digital camera. Additionally, the method may access a database comprised of information associated with a plurality of communication devices. In this manner, information associated with the specific digital camera may be identified and used by the method for processing a service request for ordering exposures.

Upon identifying the device, the method proceeds to step 703 where the method determines the number of exposures being requested. For example, a data encoded word associated with the request for exposures may include several bits of information to identify the number of exposures requested (i.e. 1010 may be a request for 10 exposures).

In one embodiment, a user may request special processing for the exposures requested. For example, a user may want five images processed into four by six traditional prints and five prints to be processed into five by seven traditional prints. As such, the user may associate desired image processing with the request for exposures.

Upon determining the number of exposures, the method proceeds to step 704 where the method determines the cost for the requested exposures. For example, a user may request three four by six prints, three five by seven prints, and four panoramic prints. As such, the method may determine the cost for the prints being requested.

Upon determining the cost, the method proceeds to step 705 where the method requests payment for the requested exposures. For example, a user may provide credit card information in advance for ordering exposures. As such, the credit card information may be stored within a database and associated with the device identifier for the user's digital camera.

The method may access the database and retrieve credit card information for processing a credit card transaction for the ordered exposures. In other embodiments, other payment information may be used to for providing payment for ordered exposures. For example, a bank account number may be provided, a user account such as a service account number may be provided, or other types of accounts which may be used for providing payment of the ordered services. In one embodiment, a user may provide payment information with the request thereby allowing the method to pay using a payment method provided by the user of the digital camera for paying for exposures.

Upon requesting payment, the method proceeds to step 706 where the method validates the payment. For example, credit card information may be used for payment and a credit card transaction for the credit card may be submitted for approval. As such, a confirmation of the transaction may be received by the method either validating or invalidating the transaction.

Upon validating the transaction, the method proceeds to step 707 where the method sends a confirmation to the user for confirming or denying the transaction. For example, if a credit card was no longer valid or the amount exceeded the available balance, a confirmation denying the transaction may be communicated to the digital camera. In the same manner, if the transaction was valid, information may be communicated to the digital camera validating the transaction. The digital camera may then be programmed to allow a user to capture the ordered number of exposures for processing. For example, a counter associated with the digital camera may be set at a value corresponding with the number of ordered exposures. As a user captures images and selects the images for processing, the counter may be decremented to reflect the number of prepaid exposures remaining. The number of available exposures may then be displayed within a user interface associated with the digital camera and incremented or decremented as required.

In one embodiment, the method may provide payment information to the user via the digital camera allowing the user to accept or deny charges. Additionally, upon the user accepting or denying the charges, the method may cancel or confirm the transaction as required.

Upon sending confirmation for the ordered exposures, the method proceeds to step 708 where the method ends. In this manner, a user may request exposures and pre-pay for the exposures for processing digital images into a desirable and prepaid format.

In another embodiment, pricing information may be provided to a user via the digital camera for the number of exposures being ordered. For example, the digital camera may include software for calculating pricing information based upon the selected exposures and processing. For example, the digital camera may allow a user to select any number of four by six prints, five by seven prints, panoramic prints, double prints, etc. As such, the digital camera may calculate the cost associated with ordering a display the cost to the user. Upon a user accepting the requested exposures and cost, the digital camera may communicate the request for additional exposures including cost information for the number of exposures requested. As such, a request for payment may be requested using the communicated cost information.

Wireless communication of information associated with digital images may be provided in a plurality of ways. Some examples of wireless communication systems and protocols operable to be used with the present invention are provided below and may include, but are not limited to, CDMA, GSM, TDMA, PCS, UMTS, and GPS.

Wireless refers to a communications, monitoring, or control systems in which electromagnetic or acoustic waves carry a signal through atmospheric space rather than along a wire. In most wireless systems, radio-frequency (RF) or infrared (IR) waves are used. Wireless transceivers are available for connection to portable and notebook computers, allowing Internet access in selected cities without the need to locate a telephone jack. Eventually, it will be possible to link any computer to the Internet via satellite, no matter where in the world the computer might be located.

CDMA (Code-Division Multiple Access)

CDMA, one of the three wireless telephone transmission technologies, takes an entirely different approach from GSM and the similar TDMA. CDMA, after digitizing data, spreads it out over the entire bandwidth it has available. Multiple calls are overlaid over each other on the channel, with each assigned a unique sequence code. The digital wireless personal communication service (PCS) is expected to use CDMA widely in the United States.

GSM (Global System for Mobile Communication)

GSM (Global System for Mobile communication) is a digital mobile telephone system that is widely used in Europe and other parts of the world. GSM uses a variation of time division multiple access (TDMA) and is the most widely used of the three digital wireless telephone technologies (TDMA, GSM, and CDMA). GSM digitizes and compresses data, then sends it down a channel with two other streams of user data, each in its own time slot. It operates at either the 900 MHz or 1800 MHz frequency band. GSM is the de facto wireless telephone standard in Europe. GSM has over 120 million users worldwide and is available in 120 countries, according to the GSM MoU Association. Since many GSM network operators have roaming agreements with foreign operators, users can often continue to use their mobile phones when they travel to other countries. American Personal Communications (APC), a subsidiary of Sprint, is using GSM as the technology for a broadband personal communications service (PCS). The service will ultimately have more than 400 base stations for the palm-sized handsets and is part of an evolution of wireless mobile telecommunication that includes High-Speed Circuit-Switched Data (HSCSD), General Packet Radio System (GPRS), Enhanced Data GSM Environment (EDGE), and Universal Mobile Telecommunications Service (UMTS).

TDMA (Time Division Multiple Access)

TDMA (time division multiple access) is a technology used in digital cellular telephone communication to divide each cellular channel into three time slots in order to increase the amount of data that can be carried. TDMA is used by Digital-American Mobile Phone Service (D-AMPS), Global System for Mobile communications (GSM), and Personal DigitalCellular (PDC). However, each of these systems implements TDMA in a somewhat different and incompatible way. An alternative multiplexing scheme to FDMA with TDMA is code division multiple access (CDMA), which takes the entire allocated frequency range for a given service and multiplexes information for all users across the spectrum range at the same time.

PCS (Personal Communications Services)

PCS (personal communications services) is a wireless phone service somewhat similar to cellular telephone service but emphasizing personal service and extended mobility. It's sometimes referred to as digital cellular (although cellular systems can also be digital). Like cellular, PCS is for mobile users and requires a number of antennas to blanket an area of coverage. As a user moves around, the user's phone signal is picked up by the nearest antenna and then forwarded to a base station that connects to the wired network. The phone itself is slightly smaller than a cellular phone. PCS is being introduced first in highly urban areas for large numbers of users.

The "personal" in PCS distinguishes this service from cellular by emphasizing that, unlike cellular, which was designed for car phone use with transmitters emphasizing coverage of highways and roads, PCS is designed for greater user mobility. It generally requires more cell transmitters for coverage, but has the advantage of fewer blind spots. Technically, cellular systems in the United States operate in the 824-849 megahertz (MHz) frequency bands; PCS operates in the 1850-1990 MHz bands. Several technologies are used for PCS in the United States, including Cellular Digital Packet Data (CDPD) and Global System for Mobile (GSM) communication. GSM is more commonly used in Europe and elsewhere.

UMTS (Universal Mobile Telecommunications System)

UMTS (Universal Mobile Telecommunications System) is a so-called "third-generation (3G)," broadband, packet-based transmission of text, digitized voice, video, and multimedia at data rates up to and possibly higher than 2 megabits per second (Mbps), offering a consistent set of services to mobile computer and phone users no matter where they are located in the world.

Based on the Global System for Mobile (GSM) communication standard, UMTS, endorsed by major standards bodies and manufacturers, is the planned standard for mobile users around the world by 2002. Once UMTS is fully implemented, computer and phone users can be constantly attached to the Internet as they travel and, as they roam, have the same set of capabilities no matter where they travel to. Users will have access through a combination of terrestrial wireless and satellite transmissions. Until UMTS is fully implemented, users can have multi-mode devices that switch to the currently available technology (such as GSM 900 and 1800) where UMTS is not yet available.

Present cellular systems are mainly circuit-switched, with connections always dependent on circuit availability. Packet-switched connection, using the Internet Protocol (IP), means that a virtual connection may always be available to any other end point in the network. It will also make it possible to provide new services, such as alternative billing methods (pay-per-bit, pay-per-session, flat rate, asymmetric bandwidth, and others). The higher bandwidth of UMTS also promises new services, such as video conferencing. UMTS promises to realize the Virtual Home Environment (VHE) in which a roaming user can have the same services to which the user is accustomed when at home or in the office, through a combination of transparent terrestrial and satellite connections. The spectrum for UMTS has been identified as frequency bands 1885-2025 MHz for future IMT-2000 systems, and 1980-2010 MHz and 2170-2200 MHz for the satellite portion of UMTS systems.

Although the disclosed embodiments have been described in detail, it should be understood that various changes, substitutions and alterations can be made to the embodiments without departing from their spirit and scope. For example, the present invention may be realized in association with several different types of wireless communication devices which may include, but are not limited to, personal digital assistants (PDAs), cellular communication devices, cellular telephones, wireless paging devices, wireless computing systems, or other systems or wireless devices.

What is claimed is:

1. A wireless enabled electronic communication device comprising:

a user interface including a plurality of digital image service request function buttons operably coupled to a digital camera and a communication module operable to connect to a wireless data communication network to determine digital image service availability in response to a user selecting one of the digital image service request function buttons; and a memory device operably coupled to the digital image service request function buttons to store a digital image and provide the digital image based on availability of the requested digital image service;

wherein the digital image service request function buttons are reprogrammable;

the memory device operable to store a reference to the selected digital image service request function button if the service is unavailable; and the memory device operable to store the digital image in association with the reference until the service is available.

2. The device of claim 1 further comprising the communication module operable to communicate a device identifier and a digital image service request identifier to the wireless data communication network for processing the requested digital image service.

3. The device of claim 1 wherein one of the digital image service request function buttons comprises a digital image upload service request function button.

4. The device of claim 3 wherein one of the digital image service request function buttons comprises a digital image print service request function button.

5. The device of claim 1 wherein one of the digital image service request function buttons comprises a digital image email service request function button.

6. The device of claim 1 wherein one of the digital image service request function buttons comprises a digital image message service request function button.

7. The device of claim 1 further comprising an Internet service access function button.

8. The device of claim 1 further comprising an Email service access function button.

9. The device of claim 1 wherein the reference includes an image message service request reference.

10. The device of claim 1 wherein the reference include an image upload service request reference.

11. The device of claim 1 wherein the reference includes an email service request reference.

12. The device of claim 1 further comprising a communication module operable to enable access if the user subscribes to the requested digital image service, prior to communicating the digital image.

13. The device of claim 1 wherein one of the digital image service request function buttons includes a graphical digital image service request function icon displayed within a graphical user interface of the user interface.

14. The device of claim 1 further comprising a graphical user interface operable to display a web browser including a selectable link operably associated with determining availability of an Internet based service.

15. The device of claim 1 wherein one of the digital image service request function buttons initiates plural service requests in response to the user selecting the digital image service request function button.

16. The device of claim 15 wherein the plural services includes at least two of an internet service, an email service, a messaging service, a USB communication service, a modem communication service, a digital image upload service, a digital image print service, a digital image email service, or a digital image messaging service.

17. The device of claim 1 further comprising a graphical user interface operable to display a digital image payment service request function icon operable to initiate payment for the requested digital image service.

18. The device of claim 17 wherein the cellular communication device includes a personal communications services enabled cell phone.

19. The device of claim 17 wherein the cellular communication device includes a GPRS enabled personal digital assistant (PDA).

20. The device of claim 1 further comprising housing including the digital camera and the communication module housed within the housing and operable as a cellular communication device.

21. The device of claim 1 wherein the cellular communication device includes a UMTS enabled cell phone.

22. A digital image capturing device comprising:
 a digital camera operable to record digital images to be used in association with a service request; and
 a service request enabled communication module operable in response to selection of one of a plurality of physical buttons to determine availability of the service request and communicate at least one of the digital images to a destination in response to the availability of the service;
 wherein the communication module is operable to store a reference to the selected service request if the service is unavailable; and
 wherein the communication module is operable to store one of the digital images in associated with the reference until the service is available.

23. The device of claim 22 further comprising a traditional print service request function button.

24. The device of claim 23 further comprising a Bluetooth-enabled communication module operable to communicate the traditional print service request and the at least one digital image in response to available traditional print service.

25. The device of claim 23 further comprising an Infrared enabled communication module operable to communicate the traditional print service request and the at least one digital image in response to available, traditional print service.

26. The device of claim 22 further comprising:
 a USB enabled port operable to communicate a traditional print service request in response to a user coupling a cable to the USB enabled port; and
 a program of instructions identified in association with the traditional print service request to provide communication of the at least one digital image.

27. The device of claim 22 further comprising a counter operably associated with determining a number of prepaid digital images available to be captured in association with a print service operable to convert the prepaid digital images to traditional print photos.

28. The device of claim 22 further comprising a removable memory card operable to store the at least one digital image.

29. The device of claim 22 further comprising a reprogrammable Email and Internet service request function button operably associated with the Email and Internet service request.

30. The device of claim 22 farther comprising an Email service request operable to request an Email service using a terrestrial communication medium.

31. The device of claim 22 further comprising a cellular telephone.

32. The device of claim 22 further comprising a single-use digital camera including a traditional print service request enabled communication module, the single-use digital camera, including a pre-paid number of exposures for providing traditional photo prints in association with the traditional print service.

33. The device of claim 22 further comprising a PDA.

* * * * *